US006782496B2

(12) United States Patent
Fleming (10) Patent No.: US 6,782,496 B2
(45) Date of Patent: Aug. 24, 2004

(54) ADAPTIVE HEARTBEATS

(75) Inventor: Roger A. Fleming, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 09/833,572

(22) Filed: Apr. 13, 2001

(65) Prior Publication Data

US 2002/0152446 A1 Oct. 17, 2002

(51) Int. Cl.[7] .............................................. G06F 11/00
(52) U.S. Cl. ........................................... 714/55; 714/48
(58) Field of Search ..................................... 714/48, 55

(56) References Cited

U.S. PATENT DOCUMENTS

| | | | | |
|---|---|---|---|---|
| 5,699,511 A | * | 12/1997 | Porcaro et al. | 714/55 |
| 5,978,939 A | * | 11/1999 | Mizoguchi et al. | 714/55 |
| 6,145,103 A | * | 11/2000 | Typaldos et al. | 714/55 |
| 6,446,225 B1 | * | 9/2002 | Robsman et al. | 714/55 |

* cited by examiner

*Primary Examiner*—Nadeem Iqbal
*Assistant Examiner*—Christopher Euripidou (57) ABSTRACT

The present invention provides a system and method of adjusting a heartbeat timeout utilized for monitoring a process in a distributed system. The distributed system includes a plurality of processes monitoring one another by transmitting messages (i.e., heartbeats) indicative of a process being operational. A first process monitoring a second process is operable to receive one or more heartbeats from the second process in the distributed system. If the first process fails to receive a heartbeat from the second process prior to an expiration of the heartbeat timeout, the second process is suspected of failing. If the first process receives a heartbeat from the second process prior to the expiration of the heartbeat timeout, the first process recalculates the heartbeat timeout. Recalculating the heartbeat timeout includes gradually increasing or decreasing the heartbeat timeout based on a period of time to receive a heartbeat. Thus, the heartbeat timeout is gradually increased or decreased based on observed conditions, and transient conditions, which may affect transmission within the distributed system, may be accounted for prior to suspecting a process failure.

32 Claims, 4 Drawing Sheets

ADAPTIVE HEARTBEATS

The following applications containing related subject matter and filed concurrently with the present application on Apr. 13, 2001 are hereby incorporated by reference: Ser. No. 09/833,650, entitled System and Method for Detecting Process and Network Failures in a Distributed System, Publication No. US 2002/0152431 A1; Ser. No. 09/833,771, entitled System and Method for Detecting Process and Network Failures in a Distributed System Having Multiple Independent Networks, Publication No. US 2002/0152432 A1; and Ser. No. 09/833,573, entitled Probationary Members, Publication No. US 2002/0161849 A1.

FIELD OF THE INVENTION

The present invention is generally related to utilizing an adaptive threshold to detect a failed process in a distributed computer system.

BACKGROUND OF THE INVENTION

In recent years, reliable, high performance, computer systems have been, and still are, in great demand. Users have also demanded the introduction and propagation of multiprocessor distributed computer systems to support their computing processes (e.g., simulations, parallel processing, etc.). A distributed computer system generally includes a collection of processes and a collection of execution platforms (i.e., hosts). Each process may be capable of executing on a different host, and collectively, the processes function to provide a computer service. A failure of a critical process in a distributed system may result in the service halting. Therefore, techniques have been implemented for detecting a failure of a process in a timely manner, such that an appropriate action can be taken.

A conventional technique for detecting failure of a process includes the use of heartbeats, which are messages exchanged between processes at regular intervals of time, for example, on a network link or between a set of interfaces relegated to an exchange of internal control messages. Two methods are commonly used. The first is a request-response scheme. A sending process may send out a heartbeat (hereinafter referred to as a "ping") to which it expects a response (hereinafter referred to as a "pong") from a remote process (e.g., another process in the same group) in a distributed system. The sending process measures the time interval between issuing the "ping" and receiving back the "pong". This time interval is the heartbeat arrival time. According to this technique, if the sending process, expecting a "pong", does not receive it prior to the expiration of a predetermined length of time, i.e., prior to the expiration of a heartbeat timeout, the remote process is suspected to have failed. Corrective action, such as eliminating the suspected process, may thus be taken.

A second method is a heartbeat stream scheme. For example, a sending process A, sends a sequence of heartbeat messages to a receiving process B. Process B measures the time interval between receiving successive heartbeat messages from process A. This time interval is the heartbeat arrival time for the second method. If process B does not receive a heartbeat prior to the expiration of a predetermined length of time, i.e., prior to the expiration of a heartbeat timeout, the remote process (e.g., process A) is suspected of failing. Once more, corrective action, such as eliminating the suspected process, may thus be taken.

The common feature in these two schemes is that a heartbeat arrival time is measured. If this time exceeds a specified heartbeat timeout, corrective action is taken. The present invention applies to both these schemes.

The length of time for a heartbeat to travel between processes may vary based on a variety of conditions, such as system or network load, local area network (LAN) pauses, and other transient events. The heartbeat timeout may be soft-tunable, i.e., a system administrator can set the heartbeat timeout to an appropriate length of time for a particular network or application. However, a system administrator may need to continually monitor a network on which the heartbeats are transmitted and other factors affecting the transmission of heartbeats for determining the appropriate length of time for the heartbeat timeout. Furthermore, the conditions affecting the transmission of heartbeats may change frequently. Therefore, the system administrator may need to change the length of the heartbeat timeout frequently to account for transient conditions that may affect the transmission of heartbeats. Furthermore, conventional techniques for monitoring processes in a system, such as the two schemes described above, generally do not account for transient conditions that may affect transmission of heartbeats.

SUMMARY OF THE INVENTION

In one respect, the present invention includes a method including the steps of (1) receiving a heartbeat from a process in the distributed system; (2) determining whether a heartbeat arrival time of the received heartbeat is less than a first heartbeat timeout; and (3) adjusting the first heartbeat timeout in response to the heartbeat arrival time being less than the heartbeat timeout.

The method further comprises steps of recalculating the first heartbeat timeout, such that the recalculated heartbeat timeout is less than or greater than the first heartbeat timeout. Then, adjusting the first heartbeat timeout to be equal to the recalculated heartbeat timeout. The recalculated heartbeat timeout is based on the heartbeat arrival times of one or more heartbeats The method of the present invention includes steps that may be performed by computer-executable instructions recorded on a computer-readable medium.

In still another respect, the present invention includes a distributed system having a plurality of processes in communication with each other. The distributed system includes a first host executing a first process of the plurality of processes; a second host executing a second process of the plurality of processes; and at least one communication path connecting the first and second host. The second process is operable to transmit a series of heartbeats on at least one communication path to the first process. The first process is capable of monitoring the second process based on the received series of heartbeats and based on an adjustable heartbeat timeout associated with a period of time for receiving a heartbeat from the second process before suspecting a failure of the second process. The first process is further capable of adjusting the heartbeat timeout in response to receiving a heartbeat in the series of heartbeats prior to the expiration of the heartbeat timeout.

It is desirable not to have a heartbeat timeout that is too long, resulting in an extended period of time in which a process failure goes undetected. On the other hand, when the heartbeat timeout is too strict, a process may be improperly suspected of failing and corrective actions may unnecessarily be taken in response to improperly suspecting a failed process. The present invention provides an adjustable heartbeat timeout that may be adjusted based on observed conditions and which minimizes improperly suspecting a failed process.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
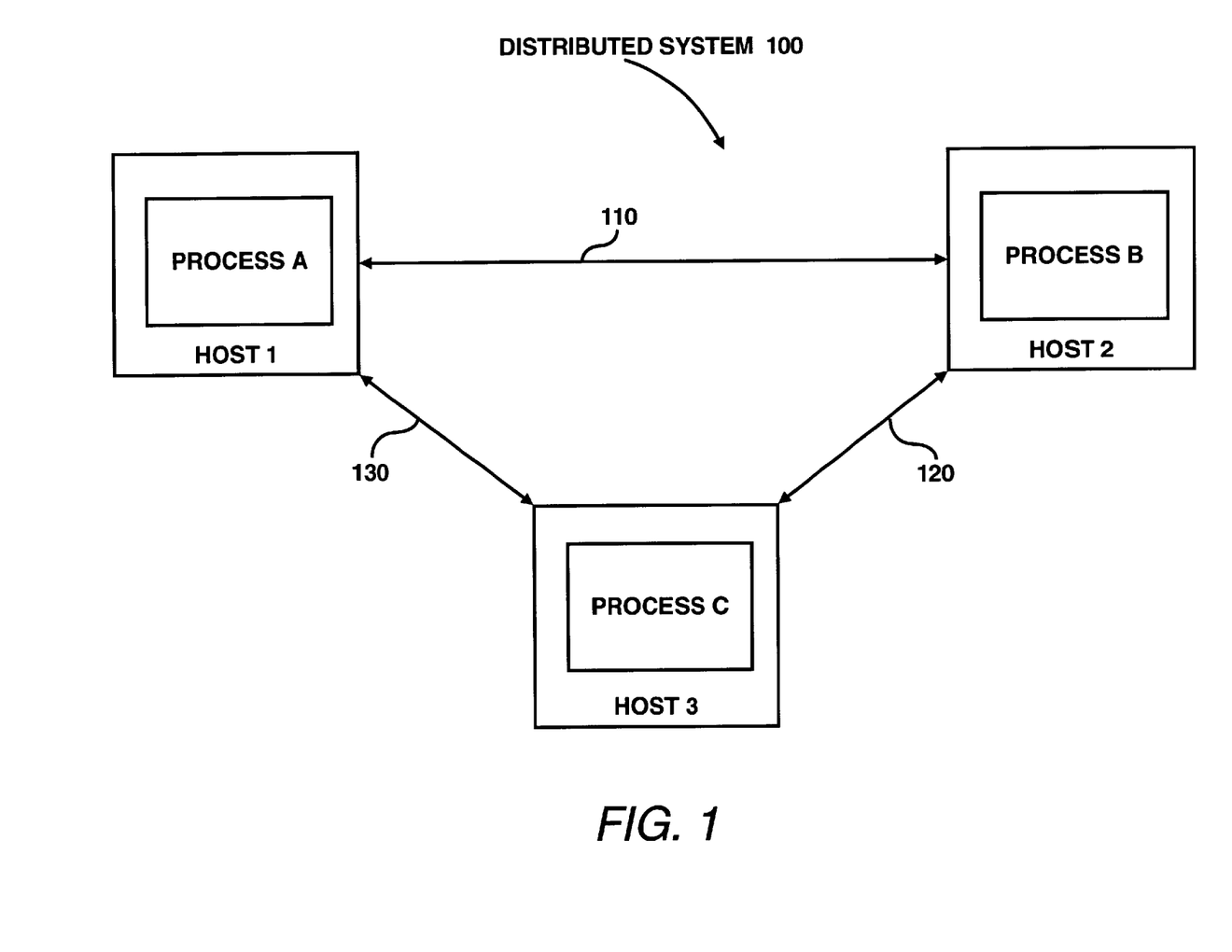
FIG. 1 illustrates an exemplary block diagram of a distributed system employing the principles of the present invention.

FIG. 1 shows a distributed system 100 employing the principles of the present invention. The distributed system 100 includes host 1, host 2 and host 3 executing process A, process B and process C, respectively. Processes A–C function to provide a service to a plurality of users via distributed system 100. Hosts 1–3 are connected via bi-directional communication paths 110, 120 and 130. Hosts 1–3 are typical nodes in a distribution system and can include a data processing system, memory and network interface, all of which are not specifically shown. Communication paths 110, 120 and 130 include, for example, network links in one or more networks. It will be apparent to those of ordinary skill in the art that an arbitrary number of hosts in distributed system 100 may be supported in an arbitrary configuration. Furthermore, each host may execute one or more processes, and two hosts may be connected by more than one communication path.

An administration function performed by distributed system 100 can include detecting failure of one or more of processes A–C, such that corrective action (e.g., eliminating and/or replacing a failed process) can be taken when a process fails. Accordingly, processes A–C transmit heartbeats on communication paths 110–130 via hosts 1–3 to detect a process failure.

For example, considering the request-response scheme described above, process A may monitor process B by sending a "ping" to process B. Process B should respond with a "pong" prior to the expiration of a heartbeat timeout. If the heartbeat timeout expires prior to receiving a heartbeat from process B, process B is suspected of failing and corrective action may be taken. For example, process A sends its suspicions to process C to try to remove process B (e.g., host 2) from a "view." If a consensus is reached (for example, two members, such as process A and C, both suspect a third member, such as process B, of failing), the third member is removed from the "view". The third member may then be removed and replaced.

Other techniques for detecting process failures may be employed, such as disclosed in applications Ser. No. 09/833,650 and Ser. No. 09/833,771, incorporated herein by reference, said conventional techniques may be employed, such as the request-response scheme and the heartbeat stream scheme, both described above.

The adaptive heartbeat technique of the present invention minimizes falsely detecting process failures, for example, when using the above-mentioned process failure techniques or other known methods. The adaptive heartbeat technique provides for adjustment of a heartbeat timeout based on observed conditions. For example, process A transmits a heartbeat (e.g., a "ping") to process B, which responds by transmitting a heartbeat to process A (e.g., a "pong"). Process A then observes that a "pong" was received after an expected period of time to receive the "pong" (i.e., a nominal maximum period of time, hereinafter referred to as nominal max), but the "pong" was still received prior to an expiration of a heartbeat timeout. Therefore, process B is not suspected of failing, but the circumstances suggest that heartbeats transmitted from process B are delayed, for example, by network congestion. Thus, the heartbeat timeout is increased, such that gradual increases in the period of time for process A to receive a heartbeat from process B may not cause a false detection of a failed process (e.g., failure of process B). In a similar manner, the present invention provides for decreasing a heartbeat timeout when a series of heartbeats are all received with heartbeat arrival times all smaller than the nominal max. For example, when a condition causing a bottleneck is cleared, a series of heartbeats may arrive prior to the nominal max. Thus, the heartbeat timeout may be decreased.

A nominal max may include the expected maximum period of time to receive a heartbeat from a process. It will be apparent to one of ordinary skill in the art that the length of the nominal max may depend on the network configuration and other factors affecting transmission on the network.

While the nominal max may be used to adjust the heartbeat timeout, the heartbeat timeout may be used to determine whether a process is suspected of failing. Therefore, the heartbeat timeout is maintained as being longer than the nominal max. One technique for maintaining the heartbeat timeout to be longer than the nominal max includes using a constant, hereinafter referred to as safety factor, which is a positive value. The heartbeat timeout may be calculated using the nominal max and the safety factor, as shown in equation (1).

$$\text{Heartbeat Timeout} = \text{Nominal Max} * \text{Safety Factor} \quad (1)$$

By using the safety factor to calculate the heartbeat timeout, a cushion may be included in the heartbeat timeout that accounts for conditions that may cause a heartbeat to arrive after the nominal max.

Figure 2:
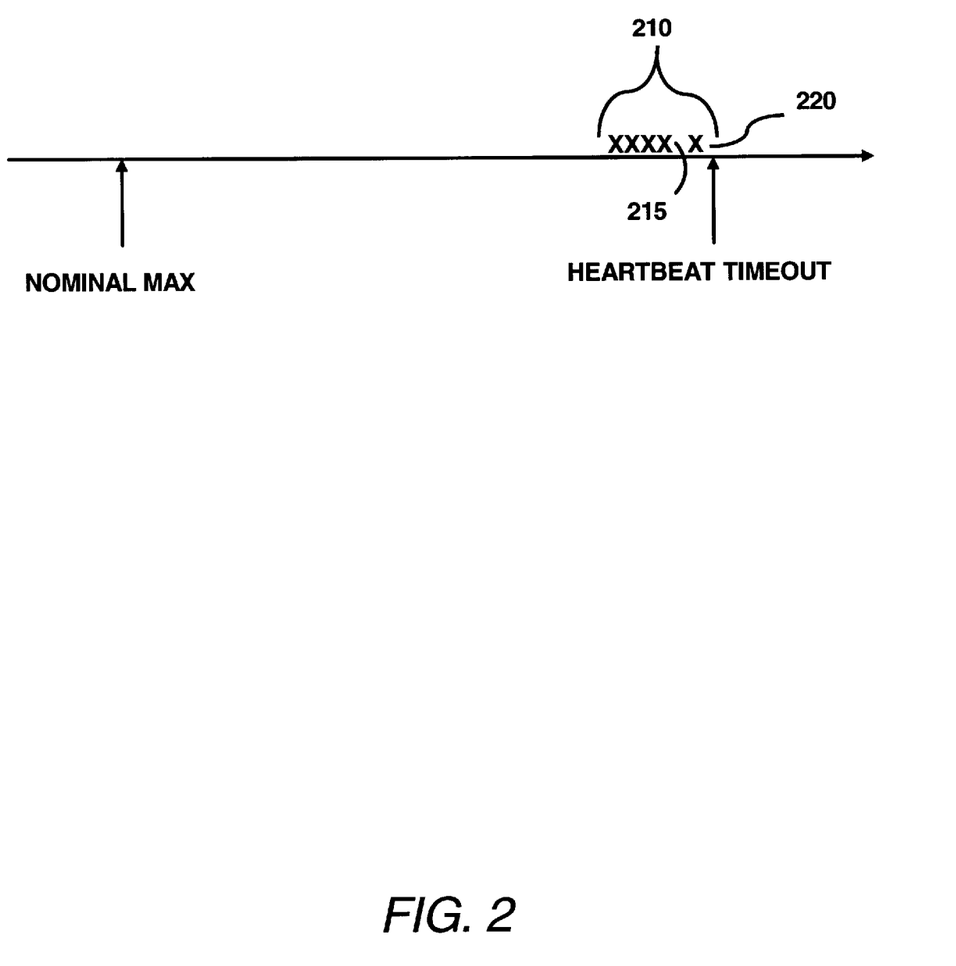
FIG. 2 illustrates a series of heartbeats received just prior to an expiration of a heartbeat timeout.

To further minimize falsely detecting a failed process, an adaptive heartbeat timeout may be implemented using actual observed conditions of the distributed system. For example, FIG. 2 illustrates a series of heartbeats 210, each represented by an "x". At least one heartbeat in series 210 is received after a nominal max and prior to the expiration of the heartbeat timeout. Then, the nominal max is set to be at least as large as the observed maximum (e.g., the period of time to receive heartbeat 220), as shown in equation (2). Note that the nominal max may be set to be as least as large as the observed maximum in equation (2) when the observed maximum is greater than the nominal max that it is being compared to.

$$\text{Nominal Max} >= \text{Observed Maximum} \quad (2)$$

The observed maximum may be equal to the period of time for the latest heartbeat in a series of heartbeats to be received after the nominal max. The length of the series of heartbeats may be determined by a predetermined measurement period of time for receiving one or more heartbeats or by a predetermined number of received heartbeats. The latest heartbeat in series 210 is heartbeat 220, because it takes the longest period of time for heartbeat 220 in series 210 to be received by the process (i.e., heartbeat 220 has the longest heartbeat arrival time of series 220). Therefore, the observed maximum is set equal to to the period of time to receive heartbeat 220, and the heartbeat timeout is calculated based on the observed maximum and equation (1), as shown in equation (3).

$$\text{Heartbeat Timeout} = \text{Observed Maximum} * \text{Safety Factor} \quad (3)$$

Based on equation (3), the heartbeat timeout is increased as the observed maximum is increased. Each of the heartbeats in series 210, shown in FIG. 2, is received after the nominal max. However, if at least one heartbeat in a series is received after the nominal max and before the heartbeat timeout, the heartbeat timeout may be calculated. For example, if only a single heartbeat in a series is received after the nominal max and before the heartbeat timeout, the observed maximum may be set equal to the heartbeat arrival time of that heartbeat. Then, the heartbeat timeout may be calculated based on that arrival time.

The heartbeat timeout may also be gradually decreased when each heartbeat in a series is received in a time interval shorter than the nominal max (i.e., the observed maximum for the series is less than the nominal max). For example, after the series of heartbeats 210, shown in FIG. 2, was received by the process, a series of heartbeats 310, shown in FIG. 3, was received by the same process. Each of the heartbeats in series 310 was received in a time interval shorter than the nominal max. After series 310 is received (e.g., at the end of a measurement period or after a predetermined number of heartbeats are received), the nominal max is recalculated based on an old nominal max (NM_old) (i.e., the nominal max calculated based on the series 210, received prior to series 310). The heartbeat timeout is then decreased, because the observed maximum (i.e., the heartbeat arrival time of heartbeat 320) is less than NM_old.

Figure 3:
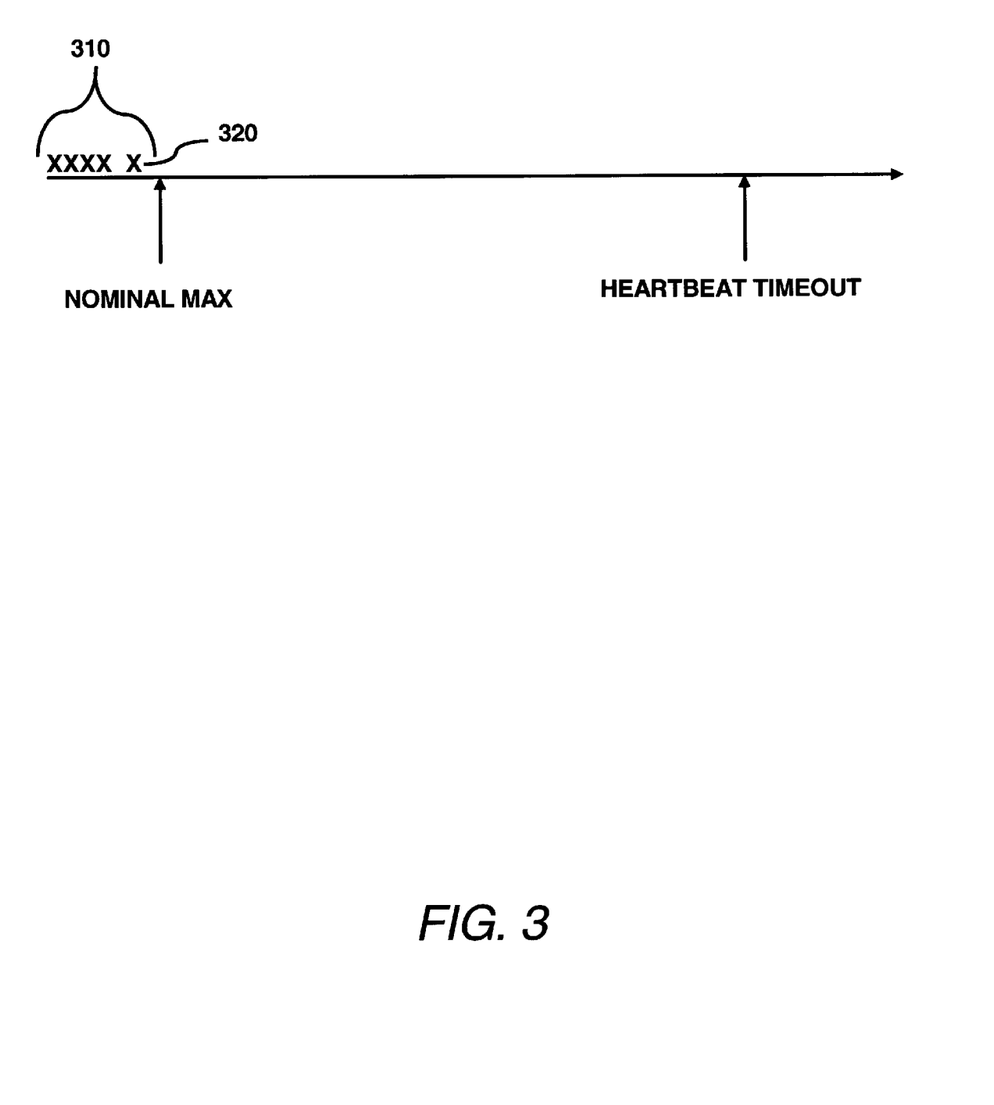
FIG. 3 illustrates a series of heartbeats received in proximity to the expiration of a nominal maximum period of time.

An exemplary equation achieving an appropriate degree of decrease in the nominal max is given below. The nominal max is calculated based on NM_old, i.e., the previous value of the nominal max, and the observed maximum of series 310, as shown in the following equation (4).

$$NM = NM\_old - \tfrac{1}{2} * (NM\_old - \text{Observed Maximum}) \quad (4)$$

The heartbeat timeout is then calculated based on the calculated nominal max and equation (1), as shown in equation (5).

$$\text{Heartbeat Timeout} = (NM\_old - \tfrac{1}{2} * (NM\_old - \text{Observed Maximum})) * \text{Safety Factor} \quad (5)$$

Additionally, the nominal max may be restricted to vary between predetermined bounds, i.e., a nominal max minimum and a nominal max maximum. When a nominal max is calculated for each series of received heartbeats, the calculated nominal max may be compared to the nominal max maximum and the nominal max minimum. If the calculated nominal max is greater than the nominal max maximum or less than the nominal max minimum, the nominal max is adjusted to lie within those limits. For example, the calculated nominal max may be set equal to the nominal max maximum or minimum if the calculated nominal max lies outside those limits.

Figure 4:
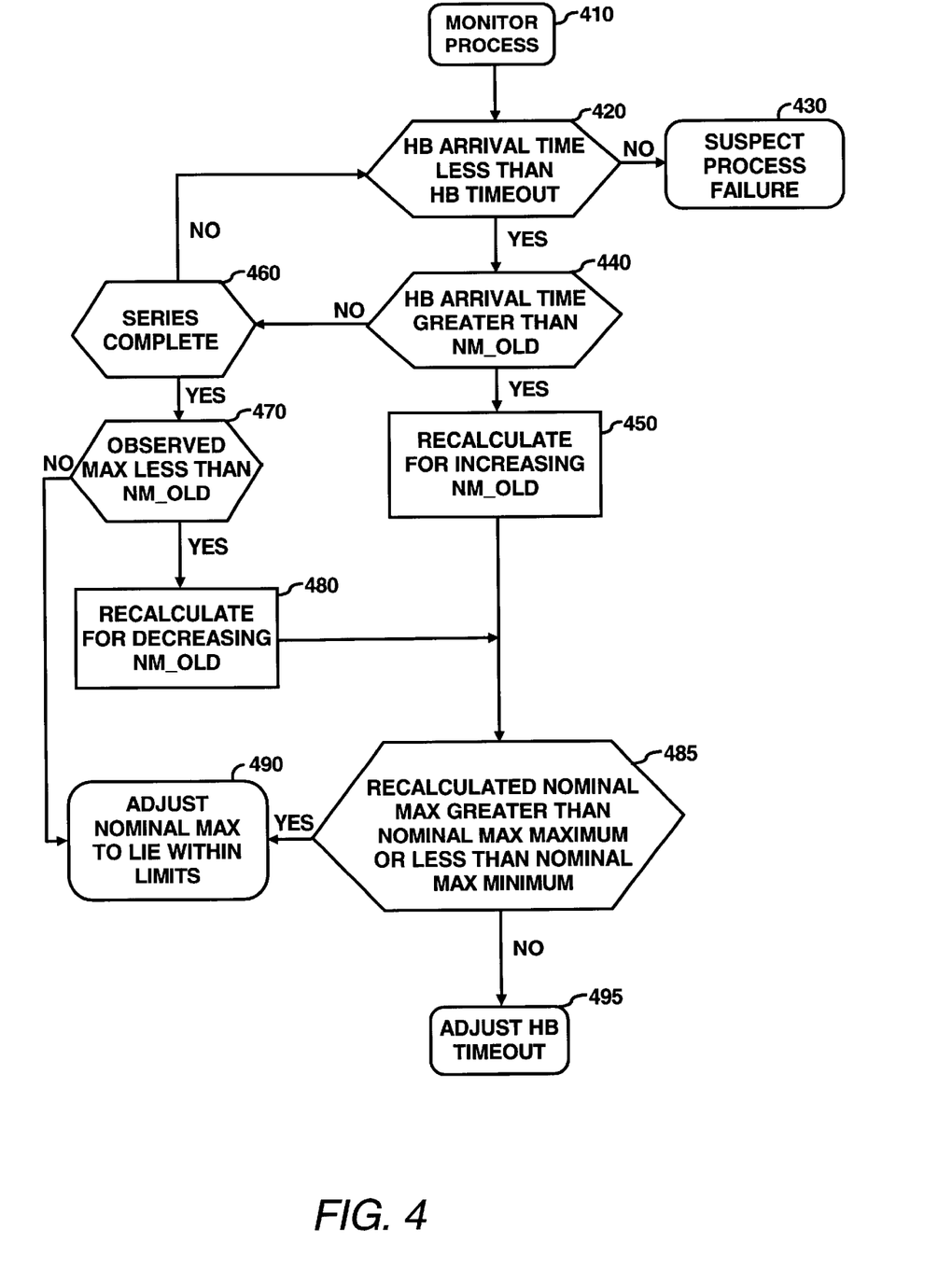
FIG. 4 illustrates a flow-diagram of an exemplary embodiment of a method employing the principles of the present invention.

FIG. 4 illustrates an exemplary method for providing an adaptive heartbeat timeout. In step 410, a process (e.g., process A) monitors another process (e.g., process B) in a distributed system, for example, by receiving a series of heartbeats from process B. Process A then determines whether the heartbeat arrival time for the received heartbeat is less than a heartbeat timeout (step 420).

If a heartbeat is received after the expiration of the heartbeat timeout in step 420, process A suspects a failure of process B and may take corrective action (step 430). If a heartbeat was received prior to the expiration of the heartbeat timeout in step 420, process A determines whether the heartbeat arrival time of the received heartbeat is greater than NM_old (i.e., a previously calculated nominal max that is the current nominal max) (step 440).

If the heartbeat arrival time is greater than the current nominal max (i.e., NM_old), the nominal max is recalculated for increasing NM_old (step 450). For example, heartbeat 215, shown in FIG. 2, is received prior to heartbeat 220. When heartbeat 220 is received, a nominal max is recalculated, because the heartbeat arrival time of heartbeat 220 is greater than NM_old, which was calculated based on the heartbeat arrival time of heartbeat 215. The nominal max is recalculated based on equation (2) and is set at least as large as the observed maximum (e.g., the heartbeat arrival time of heartbeat 220).

In step 440, if the heartbeat's arrival time is not greater than NM_old, process A determines if the series of heartbeats transmitted from process B has completed (step 460). For example, process A determines whether a received heartbeat is the last heartbeat to be received in a series of heartbeats. A last heartbeat may include the last heartbeat received prior to the expiration of a predetermined period of time or the when the sum of the received heartbeats is equal to a predetermined number. If the series is not complete, step 420 is performed. If the series is completed in step 460, process A determines if the observed maximum for the series is less than the NM_old (i.e., the current nominal max) (step 470). If the observed maximum for the series is less than NM_old, NM_old is recalculated for decreasing NM_old (step 480). For example, NM_old is recalculated based on equation (4). If the observed maximum for the series is not less than the current nominal max in step 455, the heartbeat timeout is not adjusted (step 490).

In step 485, the nominal max recalculated in either of steps 450 or 480 is compared to the nominal max minimum and nominal max maximum. If the recalculated nominal max is greater than the nominal max maximum or less than the nominal max minimum, the recalculated nominal max is adjusted to lie within those limits (step 490). For example, the calculated nominal max may be set equal to the nominal max maximum, if the recalculated nominal max is greater than the nominal max maximum. Alternatively, the recalculated nominal max may be set equal to the nominal max minimum, if the recalculated nominal max is less than the nominal max minimum. Then, the heartbeat timeout may be calculated based on the recalculated nominal max, which may be set equal to the nominal max minimum or nominal max maximum.

If the recalculated nominal max is less than the nominal max maximum or greater than the nominal max minimum, the heartbeat timeout is adjusted according to equation (3) or (5) in step 495. Also, in step 495, NM_old is set equal to the recalculated nominal max, and NM_old is used in future comparisons, such as performed in steps 440 or 470 for a next series of heartbeats. The series may be restarted in steps 490 and 495. For example, a predetermined measurement period is reset or a count of received heartbeats is reset.

The present invention provides an automatically self-adjusting window that may be responsive to observed conditions. The invention may thus minimize falsely detecting a failed process by gradually increasing a heartbeat timeout. Accordingly, improper corrective action, such as replacing a failed process when a failed process is falsely detected, is also minimized At the same time, the present invention may gradually decrease a heartbeat timeout to account for observed conditions that may have initially warranted raising the heartbeat timeout.

The steps shown in FIG. 4 are described with respect to processes A–C in distributed system 100. It will be apparent to one of ordinary skill in the art, however, that the method shown in FIG. 4 is applicable to distributed systems having a variety of configurations and having a process monitoring more than two processes. Also, the method shown in FIG. 4 and described above may be performed by a process facilitating a service, such as process A in distributed system 100, or performed by a separate process executed on a host in a distributed system.

The method shown in FIG. 4 and described above may be performed by a computer program. The computer program can exist in a variety of forms both active and inactive. For example, the computer program can exist as software possessing program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are heartbeat stream scheme, both described above. signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of adjusting a heartbeat timeout value utilized for monitoring the continuation of a process in a distributed system, said method comprising steps of:

(1) receiving heartbeats from a process in said distributed system at regular intervals of time;

(2) determining whether a heartbeat's arrival time is less than or equal to a heartbeat timeout value; and (3) adjusting said heartbeat timeout value in response to the arrival times of said heartbeats being less than said heartbeat timeout value, maintaining said adjusted heartbeat timeout value always greater by a safety factor than the heartbeat arrival times of one or more recently received heartbeats.

2. The method of claim 1, wherein said step (3) further comprises steps of:

determining whether each heartbeat's arrival time is greater than a previously calculated nominal maximum, said previously calculated nominal maximum being related to the heartbeat arrival times of one or more previously transmitted heartbeats;

recalculating said previously calculated nominal maximum in response to said heartbeat arrival time being greater than said previously calculated nominal maximum, said recalculated nominal maximum being approximately equal to said heartbeat arrival time;

recalculating said previously calculated nominal maximum in response to said heartbeat arrival time being less than said previously calculated nominal maximum, said recalculated nominal maximum being scaled downwards towards said heartbeat arrival time; and adjusting said heartbeat timeout value, maintaining said adjusted heartbeat timeout value always greater by a safety factor than the recalculated nominal maximum.

3. The method of claim 2, wherein said step (3) further comprises steps of:

determining whether said recalculated nominal maximum is less than or equal to a maximum predetermined limit and greater than or equal to a minimum predetermined limit; and if not, adjusting said recalculated nominal maximum downwards at least to said maximum predetermined limit or upwards at least to said minimum predetermined limit, in accordance with its value.

4. The method of claim 2, wherein said adjusting step in claim 28 further comprises adjusting said heartbeat timeout value to be approximately equal to said recalculated nominal maximum multiplied by a safety factor value.

5. The method of claim 2, wherein said step (3) further comprises steps of:

identifying an observed maximum of a series of heartbeats;

determining whether said observed maximum is less than said previously calculated nominal maximum; and recalculating said previously calculated nominal maximum in response to said observed maximum being less than said previously calculated maximum, said recalculated nominal maximum being scaled downwards by a percentage of the difference between said previously calculated nominal maximum and said observed maximum.

6. The method of claim 5, wherein step (3) further comprises steps of:

determining whether said recalculated nominal maximum is less than or equal to a maximum predetermined limit and greater than or equal to a minimum predetermined limit; and if not, adjusting said recalculated nominal maximum downwards at least to said maximum predetermined limit or upwards at least to said minimum predetermined limit, in accordance with its value.

7. The method of claim 5, wherein said adjusting step in claim 2 further comprises adjusting said second heartbeat timeout value to be approximately equal to said recalculated nominal maximum multiplied by a safety factor value.

8. The method of claim 5, wherein said series of heartbeats includes one or more heartbeats received within a predetermined period of time.

9. The method of claim 5, wherein said series of heartbeats includes a predetermined number of heartbeats.

10. A distributed system including a plurality of processes in communication with each other, said distributed system comprising:
   a first host capable of executing a first process of said plurality of processes;
   a second host capable of executing a second process of said plurality of processes;
   at least one communication path connecting said first and second host;
   said second process transmitting a series of heartbeats on said at least one communication path to said first process at regular intervals of time, wherein said first process is capable of monitoring said second process based on the heartbeat arrival times of said received series of heartbeats and based on an adjustable heartbeat timeout value, said adjustable heartbeat timeout value being associated with and maintained always greater by a safety factor than the heartbeat arrival times of one or more previously transmitted heartbeats from said second process, said first process detecting at least one heartbeat having a heartbeat arrival time that equals or exceeds said heartbeat timeout value before suspecting a failure of said second process.

11. The distributed system of claim 10, wherein
   said first process measures heartbeat arrival times by measuring the time interval between receiving successive heartbeats;
   said first process is capable of determining whether a heartbeat in said series is received prior to the time interval equaling or exceeding said heartbeat timeout value; and
   said first process is further capable of adjusting said heartbeat timeout value in response to a heartbeat arrival time of said heartbeat being less than said heartbeat timeout value, said heartbeat arrival time adjustment being related to the magnitude of the most recently measured one or more time intervals.

12. The distributed system of claim 11, wherein said first process is capable of recalculating said heartbeat timeout value, whereby said heartbeat timeout value is increased.

13. The distributed system of claim 11, wherein said first process is capable of recalculating said heartbeat timeout value, such that said heartbeat timeout value is decreased.

14. A computer readable medium on which is embedded a program, the program performing a method for adjusting a heartbeat timeout value utilized for monitoring the continuation of a process in a distributed system, said method comprising steps of:
   (1) receiving heartbeats from a process in said distributed system at regular intervals of time;
   (2) determining whether a heartbeat's arrival time is less than a heartbeat timeout value; and
   (3) adjusting said heartbeat timeout value in response to the arrival times of said heartbeats being less than said heartbeat timeout value, maintaining said adjusted heartbeat timeout value always greater by a safety factor than the heartbeat arrival times of one or more recently received heartbeats.

15. The method of claim 14, wherein step (3) further comprises steps of:
   determining whether each heartbeat's arrival time is greater than a previously calculated nominal maximum, said previously calculated nominal maximum being related to the heartbeat arrival times of one or more previously transmitted heartbeats;
   recalculating said previously calculated nominal maximum in response to said heartbeat arrival time being greater than said previously calculated nominal maximum, said recalculated nominal maximum being approximately equal to said heartbeat arrival time;
   recalculating said previously calculated nominal maximum in response to said heartbeat arrival time being less than said previously calculated nominal maximum, said recalculated nominal maximum being scaled downwards towards said heartbeat arrival time; and
   adjusting said heartbeat timeout value, maintaining said adjusted heartbeat timeout value always greater by a safety factor than the recalculated nominal maximum.

16. The method of claim 15, wherein said step (3) further comprises steps of:
   determining whether said recalculated nominal maximum is less than or equal to a maximum predetermined limit and greater than or equal to a minimum predetermined limit;
   if not, adjusting said recalculated nominal maximum downwards at least to said maximum predetermined limit or upwards at least to said minimum predetermined limit, in accordance with its value.

17. The method of claim 15, wherein said step (3) further comprises steps of:
   identifying an observed maximum of a series of heartbeats;
   determining whether said observed maximum is less than said previously calculated nominal maximum; and
   recalculating said previously calculated nominal maximum in response to said observed maximum being less than said previously calculated maximum, said recalculated nominal maximum being scaled downwards by a percentage of the difference between said previously calculated nominal maximum and said observed maximum.

18. The method of claim 17, wherein step (3) further comprises steps of:
   determining whether said recalculated nominal maximum is less than or equal to a maximum predetermined limit and greater than or equal to a minimum predetermined limit; and
   if not, adjusting said recalculated nominal maximum downwards at least to said maximum predetermined limit or upwards at least to said minimum predetermined limit, in accordance with its value.

19. A method of adjusting a heartbeat timeout utilized for monitoring a process in a distributed system, said method comprising steps of:
   (1) receiving a heartbeat from a process in said distributed system;
   (2) determining whether a heartbeat arrival time for said heartbeat is less than a first heartbeat timeout, said heartbeat arrival time being a period of time within which to receive said heartbeat; and
   (3) adjusting said first heartbeat timeout in response to said heartbeat arrival time being less than said first heartbeat timeout, said adjusting step comprising the steps of determining whether said heartbeat arrival time for said heartbeat is greater than a previously calculated nominal maximum, said previously calculated nominal maximum being related to the heartbeat arrival times of one or more previously transmitted heartbeats, recalculating said previously calculated nominal maximum in response to said heartbeat arrival time being greater than said previously calculated nominal maximum, said recalculated nominal maximum being approximately equal to said heartbeat arrival time, and determining whether said received heartbeat is the last received heartbeat in a series of received heartbeats in response to said heartbeat arrival time not being greater than said previously calculated nominal maximum.

20. The method of claim 19, wherein said step (3) further comprises steps of:

determining whether said recalculated nominal maximum is less than or equal to a maximum predetermined limit and greater than or equal to a minimum predetermined limit;

calculating a second heartbeat timeout in response to said recalculated nominal maximum being less than said maximum predetermined limit and greater than said minimum predetermined limit; said second heartbeat timeout being greater than said first heartbeat timeout; and adjusting said first heartbeat timeout to be equal to said second heartbeat timeout.

21. The method of claim 20, wherein said step of calculating a second heartbeat timeout further comprises calculating said second heartbeat timeout to be approximately equal to said recalculated nominal maximum multiplied by a safety factor, wherein said safety factor is a constant value.

22. The method of claim 20, further comprising a step of setting said recalculated nominal maximum to be less than or equal to said maximum predetermined limit and greater than or equal to said minimum predetermined limit in response to said recalculated nominal maximum being less than said minimum predetermined limit or greater than said maximum predetermined limit.

23. The method of claim 20, wherein said step (3) further comprises steps of:

identifying an observed maximum of said series of heartbeats in response to said received heartbeat being the last received heartbeat in said series; and determining whether said observed maximum is less than said previously calculated nominal maximum; and recalculating said previously calculated nominal maximum in response to said observed maximum being less than said previously calculated maximum, said recalculated nominal maximum being approximately equal to a difference between said previously calculated nominal maximum and a percentage of a difference between said previously calculated nominal maximum and said observed maximum.

24. The method claim 23, wherein step (3) further comprises steps of:

determining whether said recalculated nominal maximum is less than or equal to a maximum predetermined limit and greater than or equal to a minimum predetermined limit;

calculating a second heartbeat timeout in response to said recalculated nominal maximum being less than said maximum predetermined limit and greater than said minimum predetermined limit; said second heartbeat timeout being less than said first heartbeat timeout; and adjusting said first heartbeat timeout to be equal to said second heartbeat timeout.

25. The method of claim 24, wherein said step of calculating a second heartbeat timeout further comprises calculating said second heartbeat timeout to be approximately equal to said recalculated nominal maximum multiplied by a safety factor, wherein said safety factor is a constant value.

26. The method of claim 24, further comprising a step of not adjusting said first heartbeat timeout in response to said recalculated nominal maximum being less than said minimum predetermined limit or greater than said maximum predetermined limit.

27. The method of claim 19, wherein said series of heartbeats includes one or more heartbeats received within a predetermined period of time.

28. The method of claim 19, wherein said series of heartbeats includes a predetermined number of heartbeats.

29. A computer readable medium on which is embedded a program, the program performing a method for adjusting a heartbeat timeout utilized for monitoring a process in a distributed system, said method comprising steps of:

(1) receiving a heartbeat from a process in said distributed system;

(2) determining whether a heartbeat arrival time for said heartbeat is less than a first heartbeat timeout, said heartbeat arrival time being a period of time to receive said heartbeat; and (3) adjusting said first heartbeat timeout in response to said heartbeat arrival time being less than said first heartbeat timeout, said adjusting step comprising the steps of determining whether said heartbeat arrival time for said heartbeat is greater than a previously calculated nominal maximum, said previously calculated nominal maximum being related to the heartbeat arrival times of one or more previously transmitted heartbeats, recalculating said previously calculated nominal maximum in response to said heartbeat arrival time being greater than said previously calculated nominal maximum, said recalculated nominal maximum being approximately equal to said heartbeat arrival time, and determining whether said received heartbeat is the last received heartbeat in a series of received heartbeats in response to said heartbeat arrival time not being greater than said previously calculated nominal maximum.

30. The method of claim 29, wherein said step (3) further comprises steps of:

determining whether said recalculated nominal maximum is less than or equal to a maximum predetermined limit and greater than or equal to a minimum predetermined limit;

calculating a second heartbeat timeout in response to said recalculated nominal maximum being less than said maximum predetermined limit and greater than said minimum predetermined limit; said second heartbeat timeout being greater than said first heartbeat timeout; and adjusting said first heartbeat timeout to be equal to said second heartbeat timeout.

31. The method of claim 29, wherein said step (3) further comprises steps of:

identifying an observed maximum of said series of heartbeats in response to said received heartbeat being the last received heartbeat in said series;

determining whether said observed maximum is less than said previously calculated nominal maximum; and recalculating said previously calculated nominal maximum in response to said observed maximum being less than said previously calculated maximum, said recalculated nominal maximum being approximately equal to a difference between said previously calculated nominal maximum and a percentage of a difference between said previously calculated nominal maximum and said observed maximum.

32. The method of claim 31, wherein step (3) further comprises steps of:

determining whether said recalculated nominal maximum is less than or equal to a maximum predetermined limit and greater than or equal to a minimum predetermined limit;

calculating a second heartbeat timeout in response to said recalculated nominal maximum being less than said maximum predetermined limit and greater than said minimum predetermined limit; said second heartbeat timeout being less than said first heartbeat timeout; and adjusting said first heartbeat timeout to be equal to said second heartbeat timeout.

\* \* \* \* \*